(12) United States Patent
Pfeil et al.

(10) Patent No.: US 8,758,069 B2
(45) Date of Patent: Jun. 24, 2014

(54) DRIVE DEVICE FOR WATER VEHICLES

(75) Inventors: Dieter Pfeil, Eurasburg (DE);
Hans-Georg Scherer, Geretsried (DE);
Jürgen Binder, Penzberg (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 13/497,266

(22) PCT Filed: Sep. 24, 2010

(86) PCT No.: PCT/EP2010/005862
§ 371 (c)(1),
(2), (4) Date: Jun. 4, 2012

(87) PCT Pub. No.: WO2011/038869
PCT Pub. Date: Apr. 7, 2011

(65) Prior Publication Data
US 2012/0238160 A1 Sep. 20, 2012

(30) Foreign Application Priority Data

Sep. 30, 2009 (DE) .................... 20 2009 013 178 U

(51) Int. Cl.
*B63H 21/20* (2006.01)
(52) U.S. Cl.
USPC .................................................. 440/3; 440/6
(58) Field of Classification Search
USPC ................ 440/3, 6, 76, 1; 310/268; 417/420
See application file for complete search history.

(56) References Cited

U.S. PATENT DOCUMENTS

| | | | | |
|---|---|---|---|---|
| 3,310,693 | A * | 3/1967 | Aronoff | 310/104 |
| 5,229,677 | A * | 7/1993 | Dade et al. | 310/268 |
| 5,744,706 | A * | 4/1998 | Siraky | 73/112.01 |
| 6,558,209 | B1 * | 5/2003 | Voegeli | 440/4 |
| 6,698,934 | B2 * | 3/2004 | Harclerode | 384/462 |
| 7,013,859 | B2 * | 3/2006 | Linnig | 123/192.1 |
| 7,335,071 | B1 * | 2/2008 | Motsenbocker | 440/1 |
| 7,393,188 | B2 * | 7/2008 | Lawyer et al. | 417/420 |
| 7,812,495 | B2 * | 10/2010 | Shiao et al. | 310/156.22 |
| 2010/0203777 | A1 * | 8/2010 | Bratel | 440/3 |
| 2012/0094555 | A1 * | 4/2012 | Calverley et al. | 440/6 |
| 2012/0238160 | A1 * | 9/2012 | Pfeil et al. | 440/3 |

FOREIGN PATENT DOCUMENTS

JP 6190258 7/1994

OTHER PUBLICATIONS

International Search Report for related application PCT/EP2010/005862 dated Mar. 16, 2011.

* cited by examiner

*Primary Examiner* — Lars A Olson
*Assistant Examiner* — Jovon Hayes
(74) *Attorney, Agent, or Firm* — Edwards Wildman Palmer LLP; Scott D. Wofsy; David A. Tucker

(57) ABSTRACT

The invention relates to a drive device (1) for water vehicles comprising a propeller (2), a drive mechanism (3) for driving the propeller (2), and a magnetic coupling (4) which is arranged between the propeller (2) and the drive mechanism (3), wherein the magnetic coupling (4) comprises an outer magnetic element (7), an inner magnetic element (9) and a can (11), and wherein the can (11) is arranged between the inner magnetic element (9) and the outer magnetic element (7).

9 Claims, 3 Drawing Sheets

DRIVE DEVICE FOR WATER VEHICLES

Figure 1:
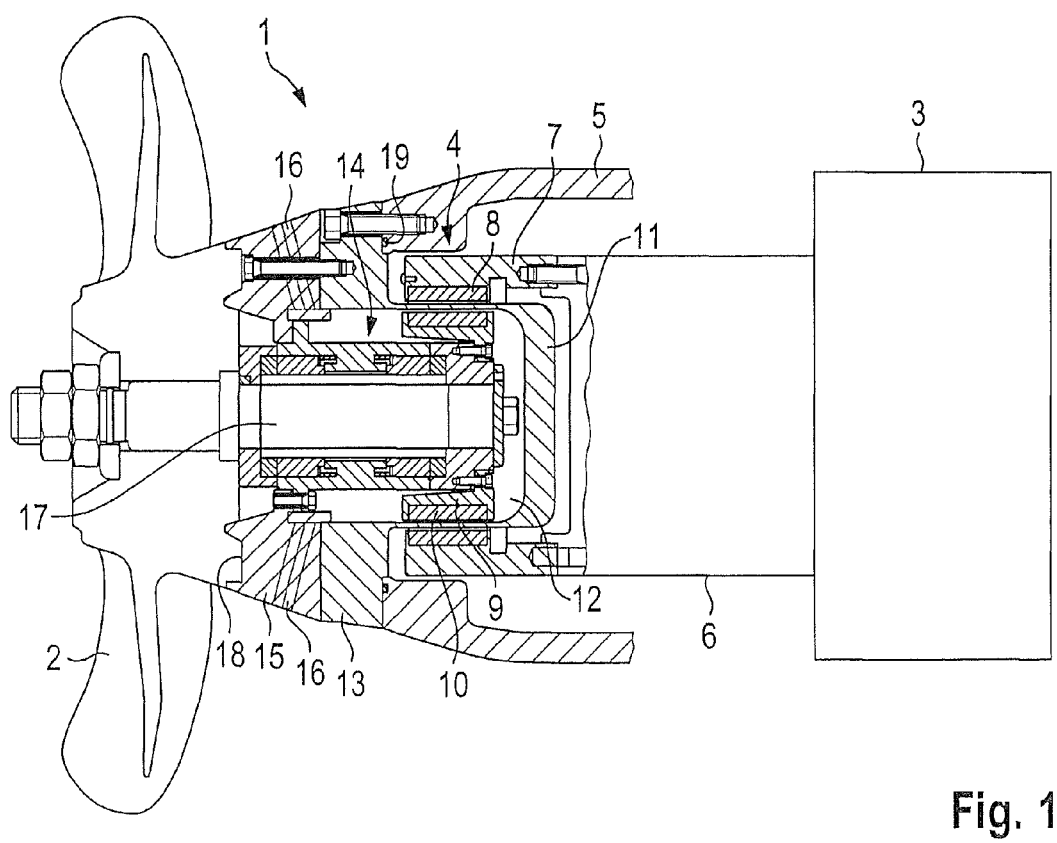

The invention concerns a drive device for water vehicles, in particular maritime vehicles, which can also be deployed under less favourable conditions, as well as such water vehicles.

Water vehicles are known from the state of the art in different arrangements. Such water vehicles usually exhibit a conventional shaft installation where a shaft is lead out from a hull below the water line. This design, however, requires elaborate sealing on the hull in order to prevent that water can penetrate from the outside to the inside of the water vehicle. Further, it is possible that lubricants can escape from the water vehicle through the opening in the hull and may thus cause environmental pollution. In particular, the sealings used so far on the shaft always show a leakage, such that a lubricant as e.g. oil or grease can escape, even if partly only in small quantities. This occurs in particular with water vehicles which are deployed in cold waters and/or in great depth, as e.g. underwater robots.

It is thus an object of the present invention to provide a drive device for water vehicles which does not exhibit any leakage of lubricant and offers excellent water tightness, having a simple construction and requiring simple and inexpensive manufacturing.

This subject is solved by a drive device with the features of claim 1. The sub claims describe preferred embodiments of the invention.

The drive device according to the invention comprises a magnetic coupling which is arranged between a propeller and a drive mechanism. The magnetic coupling has a can which is attached to a hull of the water vehicle in a sealed manner. Thus, the can seals an opening provided in the hull of the water vehicle, wherein the propeller is arranged on the outside of the opening. A torque is thus transmitted by means of the magnetic coupling. The solution of the invention thus provides in a surprisingly simple way a complete freedom from leakage at even difficult operating conditions, as e.g. in cold water or in great depth. This way the drive device of the invention can in particular be deployed on water vehicles which are used in connection with oil or natural gas production. The drive device according to the invention can be used with any kind of drive mechanism, i.e. with propeller drive mechanisms or pod-drive mechanisms or pivot drives or lateral thrust drives. In particular by using the drive device in seawater corrosion of the drive device can be prevented. Further to that, the use of the magnetic coupling also allows the application with diving robots or other autonomous vehicles which, for example, operate on the sea bottom and, due to the magnetic coupling of the invention, do not have any problems due to whirled up sand or the like.

Preferably, the propeller is attached to a propeller shaft which extends at least partially into the can. Thus, a simple support of the propeller shaft can be achieved. The can is thus attached to the hull of the water vehicle in a way that its internal space is directed towards the outside of the hull.

Preferably, a bearing, in particular a journal bearing, is arranged in the internal space of the can. The bearing here is lubricated by the water encompassing the propeller, so that no oil or grease is required as lubricant.

Preferably, further an outer magnetic element of the magnetic coupling is coupled with the drive mechanism. Here, preferably a gear mechanism is arranged between the outer magnetic element and the drive mechanism for modifying the rotational frequency of the drive mechanism. As drive mechanism a combustion engine and/or an electric motor can be used. Alternatively the outer magnetic field is formed as a stator of an electric motor such that the magnetic coupling is partially integrated in the drive mechanism.

The drive device according to the invention may preferably be arranged as propeller drive mechanism or as pod-drive mechanism, or as pivot drive mechanism or lateral thrust drive mechanism which is arranged in a duct.

As material for the bearing preferably a combination of SiC/SiC is used. The can is made of a non-magnetizable material and may, for example, be made of a stainless steel, hastelloy, ceramics or CF-Peek. A bearing case is preferably made from bronze or stainless steel, Duplex or an alloy with high nickel content, e.g. Monel.

Figure 2:
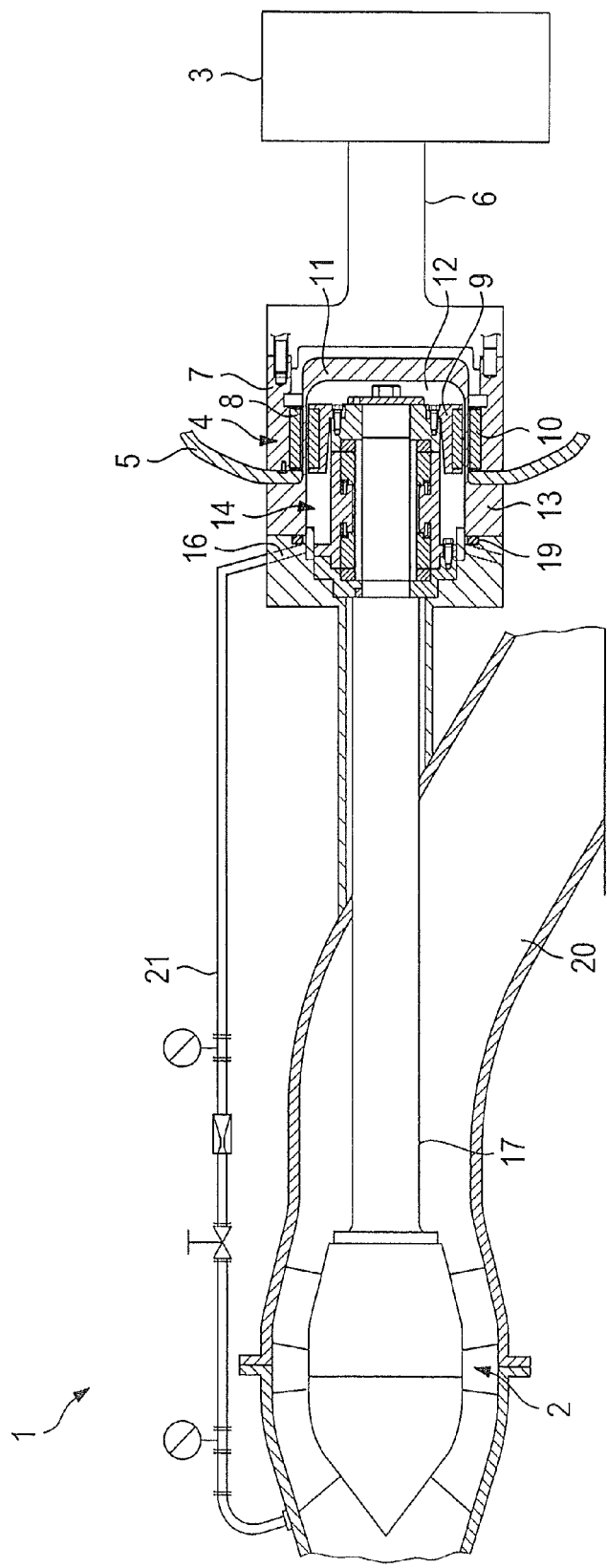
Figure 3:
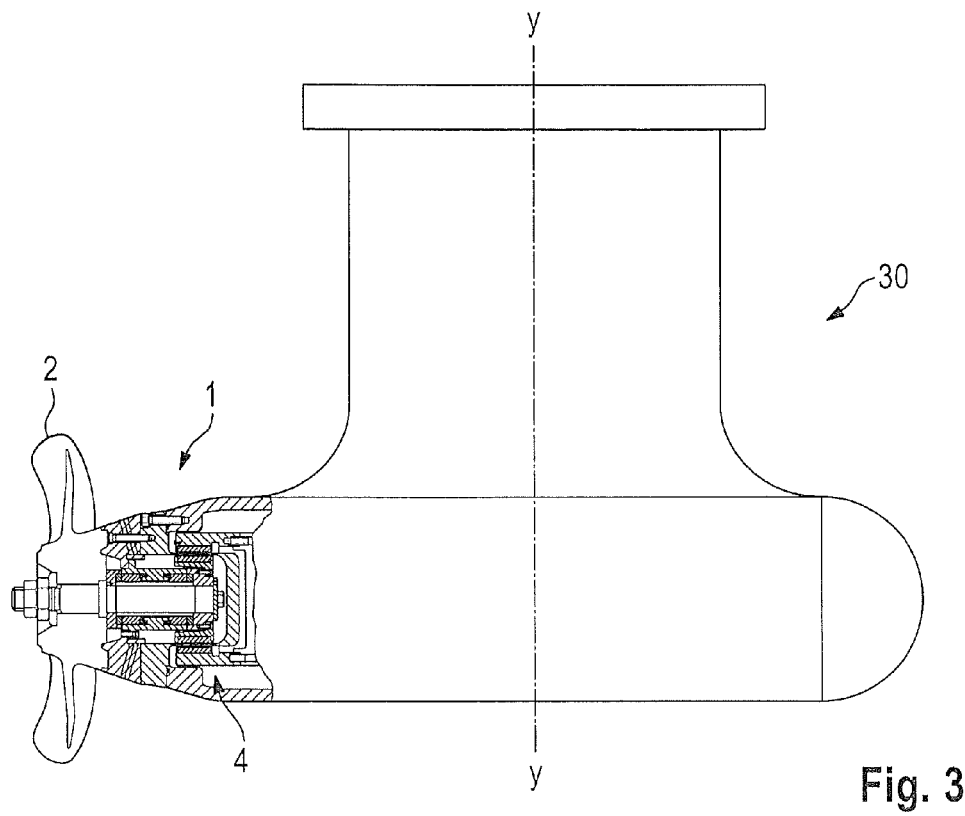
Figure 4:
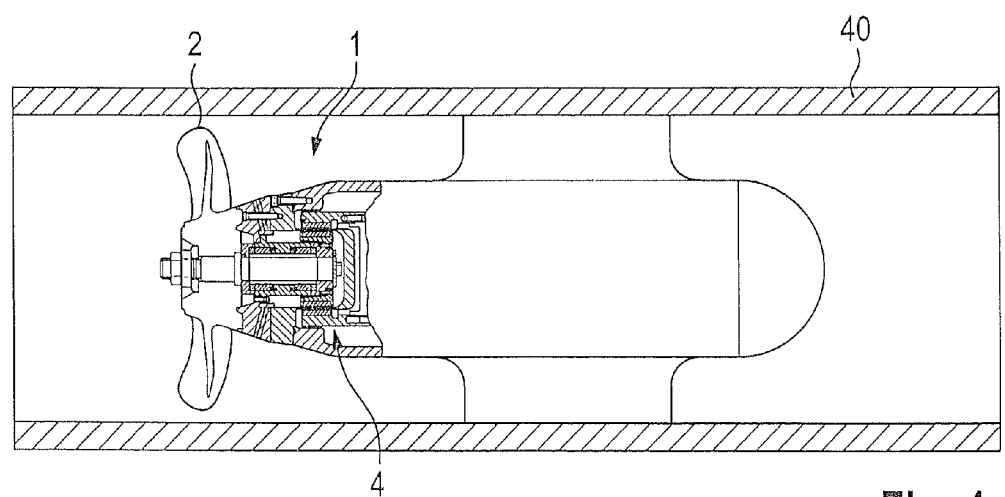

In the following the invention will be described in detail by referring to the accompanying drawing. In the drawing FIG. 1 is a schematic sectional view of a drive device according to a first embodiment of the invention, FIG. 2 is a schematic sectional view of a drive device according to a second embodiment of the invention, FIG. 3 is a schematic sectional view of a drive device according to a third embodiment of the invention, and FIG. 4 is a schematic sectional view of a drive device according to a fourth embodiment of the invention.

In the following a drive device 1 for water vehicles will be described in detail by referring to FIG. 1.

The drive device 1 of the first embodiment is a propeller drive mechanism which comprises a propeller 2 and a drive mechanism 3 which is a combustion engine in this case. Between the drive mechanism 3 and the propeller 2 a magnetic coupling 4 is arranged for transmission of a torque from the drive mechanism 3 to the propeller 2.

The magnetic coupling 4 comprises an outer rotor 7 with a multitude of permanent magnets 8, an inner rotor 9 with a multitude of permanent magnets 10, as well as a can 11 arranged between outer rotor 7 and inner rotor 9. The can 11 is attached to a hull 5 via a flange 13. The flange 13 is formed integrally with the can. The can 11 defines an internal space 12 in which the inner rotor 9 is arranged. The outer rotor 7 is coupled with the drive mechanism 3 via a driving shaft 6. The inner rotor 9 is coupled with the propeller 2 via an output shaft 17. In the internal space 12 a bearing 14 is arranged for supporting the output shaft 17. The bearing 14 comprises a bearing case 15 in which several fluid channels 16 are formed. The purpose of the fluid channels 16 is to supply water into the internal space 12 of the can 11. The bearing 14 is designed as journal bearing and has a very compact structure. Further, on one face end of the bearing case 15 a guiding 18 which guides the propeller 2, is integrally formed.

As can be seen from FIG. 1 the can 11 forms a separation between an inner region of the water vehicle and an outer region. By using the magnetic coupling 4, a sealing element which is in a sealing relation with a rotating shaft, is not required. The can 11 can be connected with the hull 5 by means of a simple and inexpensive stationary sealing 19. In order to minimize losses from the outer rotor 7 to the inner rotor 9 at the transfer via the separation wall a wall thickness of the can 11 is chosen to be very small. As the can 11 may get in contact with sea water, for example, it is made of a sea water resistant material. As the magnetic coupling 4 does not have any elastic members which, for example, could shrink at lower water temperatures, the drive device according to the present invention may also be used in cold waters without any problems. An application for underwater robots or other autonomous vehicles or tools with drive mechanism, e.g. in the oil or gas production, is as well possible without any problems. Further, the drive device according to the invention is unsusceptible against dirt which may, for example, occur with the use of underwater vehicles due to whirled up deposits or the like. Thereby an absolutely leakage free sealing of the drive device is possible.

In the following further embodiments of the drive device 1 according to the present invention will be described by referring to FIGS. 2 to 4, wherein respectively similar components are designated with the same reference signs as in the first embodiment.

FIG. 2 shows a second embodiment where a driving shaft 17 is extended and where the propeller 2 is arranged in a channel 20. Water is directed from the channel 20 via a conduit 21 to a fluid channel 16 which is formed in the bearing case 15.

FIG. 3 shows a drive device 1 which is arranged in a pod-drive 30. The pod-drive 30 here can turn around its vertical axis Y-Y.

FIG. 4 shows a drive device 1 which is arranged in a tube 40. Such drive devices may for example be formed as lateral thrust drive mechanisms. For the encapsulated drive mechanisms shown in FIGS. 3 and 4 it is indispensable that the respective drive device does not show any leakage as the leakage can practically not be discharged.

LIST OF REFERENCE SIGNS

1 Drive device
2 Propeller
3 Drive mechanism
4 Magnetic coupling
5 Hull
6 Driving shaft
7 outer magnetic element/outer rotor
8 Permanent magnet
9 inner magnetic element/inner rotor
10 Permanent magnet
11 Can
12 Internal space of the can 11
13 Flange
14 Bearing/journal bearing
15 Bearing case
16 Fluid channel
17 Output shaft/Propeller shaft
18 Guiding
19 Stationary sealing
20 Channel
21 Conduit
30 Pod-drive
40 Tube

The invention claimed is:

1. A water vehicle comprising:
a drive device, the drive device comprising:
a propeller,
a drive mechanism for driving the propeller, and
a magnetic coupling arranged between the propeller and the drive mechanism,
wherein the magnetic coupling includes an outer magnetic element, an inner magnetic element and a one-piece can, and
wherein the one-piece can (i) comprises a wall part and a bottom part together defining an internal space, and a flange part surrounding an open end of the wall part, (ii) the one-piece can is arranged between the inner magnetic element and the outer magnetic element, and (iii) the one-piece can extends bottom part first through, and is directly attached along said flange part to, an outer wall section of the water vehicle.

2. A water vehicle according to claim 1, further comprising a propeller shaft, on which the propeller is arranged, wherein the propeller shaft extends at least partially into the internal space of the one-piece can.

3. A water vehicle according to claim 1, wherein the propeller shaft is supported by means of a bearing.

4. A water vehicle according to claim 3, wherein the bearing is arranged in the internal space of the one-piece can.

5. A water vehicle according to claim 3, wherein the bearing comprises a bearing case, and wherein the bearing case comprises an integrated guiding for the propeller.

6. A water vehicle according to claim 1, wherein the outer magnetic element is coupled with the drive mechanism, and wherein in particular a gear mechanism is arranged between the outer magnetic element and the drive mechanism.

7. A water vehicle according to claim 1, wherein the drive mechanism comprises a combustion engine and/or an electric motor.

8. A water vehicle according to claim 1, wherein the outer magnetic element is a stator of an electric motor.

9. A water vehicle according to claim 3, wherein said bearing is a journal bearing.

* * * * *